Patented Sept. 22, 1931

1,824,610

UNITED STATES PATENT OFFICE

CHAUNCEY ALLAN LYFORD, OF EAST AURORA, NEW YORK, ASSIGNOR TO NATIONAL ANILINE & CHEMICAL COMPANY, INC., OF NEW YORK, N. Y., A CORPORATION OF NEW YORK

PROCESS OF RECOVERING ALCOHOL FROM ALCOHOLIC CAUSTIC FUSIONS

No Drawing. Application filed December 1, 1928. Serial No. 323,186.

This invention relates to improvements in processes for the recovery of alcohols from alcoholic caustic alkali. More particularly the invention comprises the recover of alcohol in concentrated form, directly and without rectification, from the mass resulting from the fusion of an organic compound specifically a benzanthrone compound, such as benzanthrone or chlorbenzanthrone, with alcoholic caustic alkali.

It has been proposed to recover the alcohol from alcoholic caustic alkali fusions by drowning the fusion mass in water and heating to boil off the alcohol, but the alcohol thus recovered is dilute and must be rectified to secure concentrated alcohol.

It has now been found, according to the present invention, that the alcohol can be directly recovered in concentrated form from an alcoholic caustic fusion mass obtained in the fusion of an organic compound with alcoholic caustic alkali, and therefore requires no rectification to adapt it for reuse in subsequent alcoholic caustic alkali fusions. This is accomplished by adding water to the fusion mass in an amount not in excess of that required to obtain the combined alcohol in concentrated form upon distillation, and heating the diluted fusion mass to boil off the alcohol which is directly condensed and collected. The alcohol thus obtained is of about 92 to 95 per cent strength by weight, and requires no further rectification.

In the fusion of organic compounds with alcoholic caustic alkali, the alcohol is present at the end of the fusion operation generally in the form of the corresponding alkali metal alcoholate, although a small amount of free alcohol may be present. Also, sometimes some of the alcohol may be held in combination in a form analogous to water of crystallization. In drowning such a fusion mass in water these compounds of alcohol are more or less completely decomposed to form dilute solutions of alkali in aqueous alcohol from which the alcohol can be recovered in concentrated form by rectification. It is my theory that by adding a limited quantity of water to the fusion mass, either while the mass is hot or after it has cooled, the water replaces the alcohol, and by raising the temperature to the boiling point of the alcohol the alcohol distills off in concentrated form. The water which has been added is held in combination by the caustic alkali and is thereby prevented from distilling off. While I advance the foregoing theory to explain my invention I do not intend to be limited thereto in claiming my invention.

In general, it is preferred to add to the fusion mass a weight of water equal to about the weight of the caustic alkali originally employed in making up the fusion mass. However, the quantity of water employed may vary through wide limits depending on the quantity of alcohol present in the fusion mass. A convenient way, which is also the preferred way, is to add water slowly to the fusion mass while the fusion mass is heated to a temperature above the boiling point of the alcohol, until alcohol ceases to distill over.

The invention will be illustrated by the following examples. The parts are by weight.

*Example 1.*—270 parts absolute alcohol and 450 parts commercial caustic potash are heated to 140°–145° C., in an iron kettle equipped with a reflux condenser and agitator, until a homogeneous mass is obtained. 90 parts technical benzanthrone is then slowly introduced with agitation, and heating under reflux is continued at 150° for 4 hours.

The source of heat is removed, a Liebig condenser is substituted for the reflux condenser, and water is slowly introduced into the hot melt. Alcohol distills off rapidly and is condensed and collected. The slow addition of water to the melt is continued until no more alcohol boils off, about 450 parts of water being required. The alcohol obtained has a strength of about 95 per cent by volume. The recovery is about 85 per cent of the alcohol added.

The dyestuff in the diluted melt can be isolated by any well known manner, as by further dilution with water and filtering.

*Example 2.*—450 parts commercial caustic potash and 270 parts absolute alcohol are heated at 145°–148° C. in a kettle equipped with an agitator and a Liebig condenser, until a homogeneous mass results. What little alcohol boils off at this temperature is condensed and collected. 90 parts benzanthrone is then slowly added, after which the temperature is slowly raised to 165° C. As the temperature rises, alcohol is distilled off and collected until 165° C. is reached, at which point but little additional alcohol boils off. Heating at this temperature is continued for 4 hours.

450 parts water is now slowly introduced into the hot melt. Vapors of alcohol are evolved, and are condensed and collected. The alcohol obtained has a strength of about 95 per cent by volume.

*Example 3.*—150 parts absolute alcohol and 250 parts caustic potash are heated to 145° C. in a closed kettle equipped with a reflux condenser and an agitator, until a homogeneous mass is obtained. 50 parts chlorbenzanthrone is then added and the temperature is rapidly raised to 150° C. while 32.4 parts of alcohol of 95 per cent strength by volume distils off and is collected.

After completion of the reaction about 250 parts water is slowly introduced into the hot melt, and the alcohol which distils off is condensed in a Liebig condenser and is collected. A total of about 148.5 parts of alcohol having a strength of 95 per cent by volume is recovered. About 92 per cent by weight of the alcohol used is recovered.

*Example 4.*—1 part of 2.2′-dimethyl-1.1′-dianthraquinonyl is introduced into a mixture of 3 parts of caustic potash and 2.6 parts of ethyl alcohol, and the mixture is heated under reflux at a temperature of 145° C. for about 3 hours. The fusion mass is then cooled to about 65° C. and about 3.5 parts water are added slowly while the temperature is allowed to rise and is maintained at about 87° C. A total of about 2.2 parts alcohol of 85 per cent. strength by volume distills off and is recovered. From the dilute fusion mass the dyestuff is isolated in any suitable manner.

Instead of introducing the water into the hot melt, the melt may be first cooled, water or ice then introduced, and the diluted melt then heated to boil off the alcohol. However, since an excess of water will dilute the alcohol recovered, the slow addition of water to the hot melt is preferred.

The invention is not limited to the recovery of ethyl alcohol from the fusion of benzanthrone compounds with caustic potash, or caustic soda, and ethyl alcohol or to those caustic alkali fusions of organic compounds in which ethyl alcohol is used in the fusion, but may be applied to the recovery of other alcohols, such as, isopropyl, n-propyl or tertiary butyl alcohols from caustic potash or caustic soda fusions of organic compounds in which such other alcohols are used. Wherein the specification and claims the term "benzanthrone compound" is used, it is intended to include benzanthrone as well as its derivatives.

I claim:

1. In the process of fusing an organic compound with alcoholic caustic alkali wherein a fusion mass is obtained, the improvement which comprises treating the hot fusion mass with water in an amount not in excess of that required to obtain the alcohol in concentrated form upon distillation, and boiling off, condensing and collecting the alcohol.

2. In the process of fusing an organic compound with alcoholic caustic alkali wherein a fusion mass is obtained, the improvement which comprises treating the fusion mass with water in an amount not in excess of that required to obtain the alcohol in concentrated form upon distillation, heating the diluted fusion mass to boil off the alcohol and condensing and collecting the alcohol.

3. In the process of fusing an organic compound with alcoholic caustic alkali wherein a fusion mass is obtained, the improvement which comprises slowly adding to the hot fusion mass, just about enough water to liberate the alcohol, and condensing and collecting the alcohol liberated.

4. In the process of fusing a benzanthrone compound with alcoholic caustic alkali wherein a fusion mass is obtained, the improvement which comprises treating the hot fusion mass with water in an amount not in excess of that required to obtain the alcohol in concentrated form upon distillation, heating the diluted fusion mass to boil off the alcohol and condensing and collecting the alcohol.

5. In the process of fusing a benzanthrone compound with alcoholic caustic alkali wherein a fusion mass is obtained, the improvement which comprises treating the fusion mass with water in an amount not in excess of that required to liberate the alcohol, heating the diluted fusion mass to boil off the alcohol and condensing and collecting the alcohol.

6. In the process of fusing a benzanthrone compound with alcoholic caustic alkali wherein a fusion mass is obtained, the improvement which comprises slowly adding to the hot fusion mass just about enough water to liberate the alcohol, and condensing and collecting the alcohol liberated.

7. In the process of fusing chlorbenzanthrone with alcoholic caustic alkali wherein a fusion mass is obtained, the improvement which comprises slowly adding to the hot fusion mass just enough water to liberate the alcohol, condensing and collecting the alcohol liberated, and reusing the alcohol collected in preparing an alcoholic caustic fusion.

8. In the process of fusing an organic compound with alcoholic caustic alkali wherein a fusion mass is obtained, the improvement which comprises diluting the fusion mass with water, the quantity of water employed being about equal to the weight of caustic alkali in the fusion mass, and distilling and collecting the alcohol.

9. In the process of fusing an organic compound with alcoholic caustic alkali wherein a fusion mass is obtained, the improvement which comprises slowly adding water to the resulting fusion mass in an amount not in excess of that required to produce a distillate of alcohol in concentrated form, while maintaining said fusion mass at a temperature above the boiling point of the alcohol liberated thereby, and condensing and collecting the alcohol liberated.

10. In the process of fusing a benzanthrone compound with alcoholic caustic alkali wherein a fusion mass is obtained, the improvement which comprises slowly adding water to the fusion mass maintained at a temperature above the boiling point of the alcohol liberated thereby until just sufficient water has been added to liberate the combined alcohol while condensing and collecting the alcohol liberated.

In testimony whereof I affix my signature.

CHAUNCEY ALLAN LYFORD.